(No Model.)
J. B. BENNETT.
POLISHING MACHINE.
No. 452,632. Patented May 19, 1891.
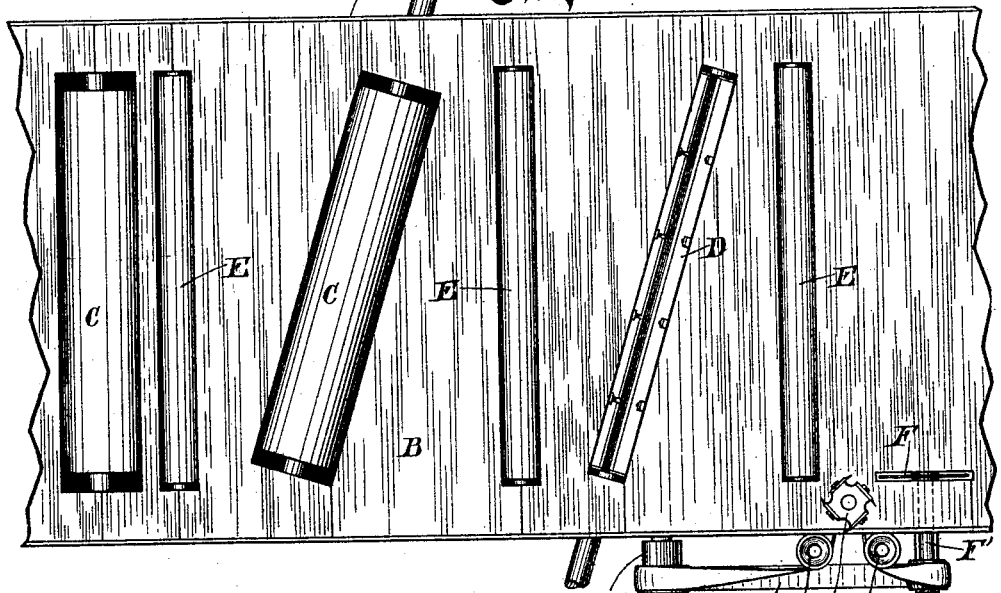
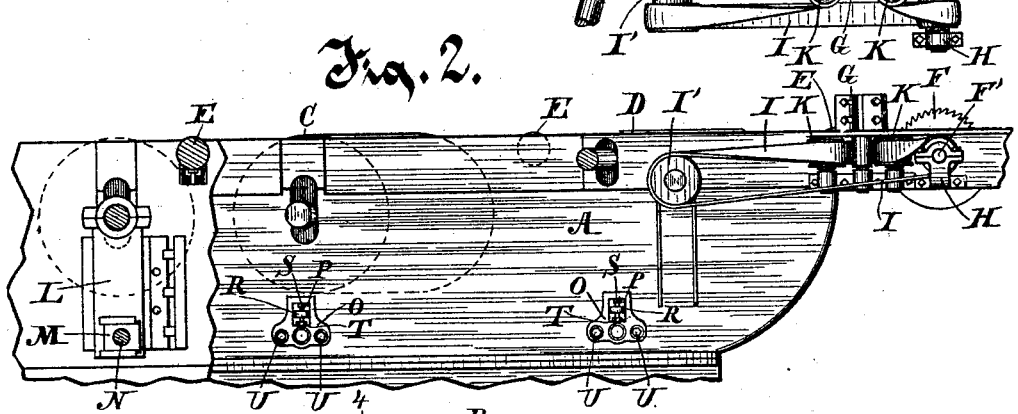
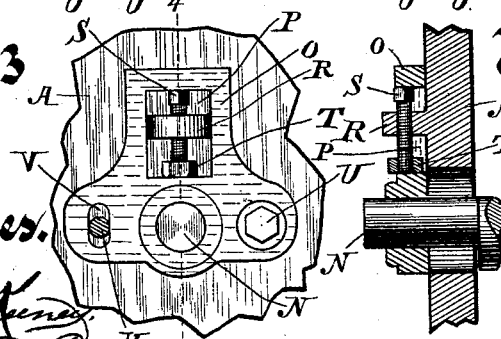
Witnesses.
Inventor.

UNITED STATES PATENT OFFICE.

JOSEPH B. BENNETT, OF WATERTOWN, ASSIGNOR, BY MESNE ASSIGNMENTS, TO THE BERLIN MACHINE WORKS, OF BELOIT, WISCONSIN.

POLISHING-MACHINE.

SPECIFICATION forming part of Letters Patent No. 452,632, dated May 19, 1891.

Application filed January 10, 1890. Serial No. 336,519. (No model.)

*To all whom it may concern:*

Be it known that I, JOSEPH B. BENNETT, of Watertown, in the county of Jefferson and State of Wisconsin, have invented new and useful Improvements in Polishing-Machines; and I do hereby declare the following to be a full, clear, and exact description of said invention, reference being had to the accompanying drawings, and to the letters of reference marked thereon, which form a part of this specification.

My invention relates to improvements in that class of polishing-machines in which rotating abrading-cylinders arranged in the same horizontal plane are used; and the invention is in the devices provided for straightening and surfacing the edges of a door or other similar material at the time it is put through the machine, and the sides are surfaced by the rotating cylinders, and also in the devices for supporting the several cylinders and rotating cutter-bar (if any) adjustably in position in the machine.

In the drawings, Figure 1 is a top plan view of a portion of the table or top of the lower part of a polishing-machine in which my improvements are used. Fig. 2 is a side elevation of the same portion of the machine, parts being broken away for convenience of illustration and to show interior parts. Fig. 3 is a view of the device for supporting and adjusting the cylinders. Fig. 4 is a central vertical section of the parts shown in Fig. 3 on line 4 4 thereof.

A is the frame of the machine.

B is the table or top of the lower part of the machine. The table B is provided with slots for the location therein of the abrading-cylinders C C, the cutter-bar D, and the feed-rolls E E. These abrading-cylinders C C and cutter-bar D are supported adjustably vertically in the frame of the machine, as will be hereinafter further described.

A small circular saw F, fixed on the arbor F', projects above the table B through an aperture therein, and is located near the line of one edge of the cylinders and cutter-bar, and is adapted for cutting off and straightening the edge of a door or any material that is being passed through the polishing-machine over the cutter-bar and abrading-cylinders.

A small cutter-head G, fixed on a vertical arbor, is located just at the rear of the saw F, and is adapted for smoothing or surfacing the edge of the door or other material that has just passed the circular saw F. The cutter-head G is located just above the table B, and its arbor is supported in bearings in the frame A. The arbor F' also has its bearings in the frame, its outer end being conveniently carried in a box H, secured to the frame. This circular saw F and the cutter-head G are driven by a belt I, running on their arbors and on the driving-pulley I', being guided and steadied by the idle-pulleys K K on arbors supported on the frame. By this system of mechanism one edge and one side of a door or other material can be surfaced by passing it once through the machine, and thereby much time and labor saved over the process which requires the material to be passed through a machine for the express purpose of surfacing a side, and again through another machine for the purpose of surfacing the edge.

The shafts of the abrading-cylinders and of the cutter-bar D have their bearings in boxes in vertically-moving blocks L L, which travel in ways on the frame A. These blocks L L are each provided with laterally-moving blocks M M, and through each pair of these blocks M M, as arranged in pairs under each abrading-cylinder and under the cutter-bar, passes a shaft N, which shaft is eccentric to its axis in that part which is in the blocks M M. These blocks L L and M M and the shafts N N are of the same form as shown and fully described in the application of myself and Anson P. Boardman, Serial No. 308,205, filed April 22, 1889, and no claim is herein made of any novelty therein. These shafts N N are each supported at their respective ends in vertically-adjustable boxes O, in which the shafts are received and are rotatable.

Each box O is placed alongside the frame A, and is provided with a recess P, which receives therein a lug R, integral with the frame A, and a set-screw S, the head of which bears against the top wall of the recess P, turns by a screw-thread through the lug R, and is adapted to raise the box O vertically or to permit its vertical descent. A jam-nut T turns on the lower end of the set-screw S and may be turned against the lower wall of the recess P, when the box has been adjusted in proper position, to lock the device in place. The bolts U U pass through vertical slots V V therefor in the box O, and turn by screw-thread into the frame A, the bolts being adapted to serve as guides for the movement of the boxes vertically, and when the box is adjusted in proper position the heads of the bolts are turned down firmly against the box, thereby serving additionally to lock the box in position on the frame.

It will be understood that as the rotating cylinders revolve very rapidly there is considerable jar to the machine, and that it is important to have a device for adjusting and supporting the cylinders that shall be strong and not liable to become loose, and that such device should be capable of very delicate adjustment for the purpose of adjusting the cylinders nicely for doing the fine work that is required in finishing doors, piano-cases, and similar articles. These qualities of strength, reliability, and delicate adjustment are found to exist in a very high degree in the device just described.

What I claim as new, and desire to secure by Letters Patent, is—

1. In a polishing-machine having vertically-adjustable cylinders carried on vertically-moving blocks which are supported on a shaft, a pair of vertically-movable boxes carrying said shaft, each of which boxes has a recess, in combination with a lug projecting rigidly from the frame of the machine into the recess and a set-screw turning through the lug and bearing against the upper wall of the recess, substantially as described.

2. In a polishing-machine, a device for supporting the ends of a shaft, which shaft supports the cylinder carrying and adjusting devices consisting of an integral box in which the end of the shaft is received and provided with a recess and a lug integral with the frame of the machine projecting therefrom into the recess in the box, a set-screw bearing against the inner top wall of the recess and turning through the lug on the frame, and guide-bolts passing through slots therefor in the box and turning into the frame, substantially as described.

3. In combination with the frame of a polishing-machine, a vertically-movable shaft-carrying box provided with a recess and vertical slots, a lug projecting from the frame into the recess, a set-screw bearing against the upper wall of the recess and turning through the lug, provided with a jam-nut thereon, and bolts turning through the vertical slots into the frame, substantially as described.

In testimony whereof I affix my signature in presence of two witnesses.

JOSEPH B. BENNETT.

Witnesses:
C. B. SKINNER,
D. HALL.